US009959354B2

(12) United States Patent
Nittka et al.

(10) Patent No.: US 9,959,354 B2
(45) Date of Patent: May 1, 2018

(54) UTILIZING USER CO-SEARCH BEHAVIOR TO IDENTIFY SEARCH QUERIES SEEKING INAPPROPRIATE CONTENT (71) Applicant: Google LLC, Mountain View, CA (US)

(72) Inventors: Robin Nittka, Zurich (CH); Matthias Heiler, Zurich (CH); David Vago, Adiswil (CH)

(73) Assignee: Google LLC, Mountain View, CA (US)

( * ) Notice: Subject to any disclaimer, the term of this patent is extended or adjusted under 35 U.S.C. 154(b) by 269 days.

(21) Appl. No.: 14/747,492

(22) Filed: Jun. 23, 2015

(65) Prior Publication Data
US 2016/0378869 A1 Dec. 29, 2016

(51) Int. Cl.
G06F 17/30 (2006.01)

(52) U.S. Cl.
CPC .... G06F 17/30867 (2013.01); G06F 17/3071 (2013.01)

(58) Field of Classification Search
CPC ........... G06F 17/30867; G06F 17/3071; G06F 17/30699; G06F 17/30707; G06F 17/30899; G06F 17/30902; G06F 17/30905
USPC ................ 707/781, 782, 783, 785, 787, 788
See application file for complete search history.

(56) References Cited

U.S. PATENT DOCUMENTS

| | | | |
|---|---|---|---|
| 7,444,324 B2 | 10/2008 | Ortega et al. | |
| 7,814,086 B2 | 10/2010 | Bartz et al. | |
| 8,024,341 B1 | 9/2011 | Even-Zohar et al. | |
| 8,296,279 B1 | 10/2012 | Singh | |
| 8,560,539 B1* | 10/2013 | Engebretsen | G06F 17/3071 707/736 |
| 8,655,902 B2 | 2/2014 | Parikh et al. | |
| 9,201,945 B1* | 12/2015 | Garrett | G06F 17/3071 |
| 2004/0006560 A1 | 1/2004 | Chan et al. | |
| 2006/0161520 A1 | 7/2006 | Brewer et al. | |
| 2011/0258148 A1* | 10/2011 | Gao | G06F 17/30867 706/12 |
| 2013/0031122 A1 | 1/2013 | Riezler et al. | |
| 2015/0154306 A1* | 6/2015 | Lightner | G06F 17/30867 707/728 |
| 2016/0188696 A1* | 6/2016 | Belghiti | G06F 17/30463 707/718 |

OTHER PUBLICATIONS

International Search Report and Written Opinion in International Application No. PCT/US2016/032288, dated Sep. 30, 2016, 10 pages.

* cited by examiner

Primary Examiner — Greta L Robinson
(74) Attorney, Agent, or Firm — Fish & Richardson P.C.

(57) ABSTRACT

A system and method for training a search query classifier may be used to develop a large database of search queries used to access inappropriate sensitive or offensive content. A database of well-known and frequently-used search queries for accessing inappropriate sensitive content is expanded by monitoring additional search queries received from a user within a preset time period of the user submitting one of the well-known and frequently-used search queries. The additional search queries received from a user are further evaluated to determine if they are likely associated with inappropriate sensitive or offensive content.

20 Claims, 5 Drawing Sheets

UTILIZING USER CO-SEARCH BEHAVIOR TO IDENTIFY SEARCH QUERIES SEEKING INAPPROPRIATE CONTENT

FIELD

This disclosure generally relates to search engines.

BACKGROUND

Internet users can search for various types of content using search engines. Content in the Internet may include sensitive or offensive content such as, for example, child pornography, gore scenes and images, terrorist or gang recruitment content, and spoof content. Because users may, in some cases, involuntarily receive the sensitive or offensive content, it is important to identify search queries for the sensitive or offensive content and to configure search results to limit exposure to certain types of the sensitive or offensive content.

SUMMARY

This disclosure generally describes a method and system for training a classifier to identify search queries seeking inappropriate sensitive or offensive content.

According to implementations, an improved method to train a search query classifier may be used to develop a large database of search queries used to access inappropriate sensitive or offensive content. A database of well-known and frequently-used search queries for accessing inappropriate sensitive or offensive content is generated. This database is expanded by identifying additional search queries received from a user within a preset time period of the user submitting one of the well-known and frequently-used search queries. The additional search queries received from a user are further evaluated to determine if they are likely associated with inappropriate sensitive or offensive content. Any additional search queries determined to be likely associated with inappropriate sensitive or offensive content are added to the database of well-known and frequently-used search queries for accessing inappropriate sensitive or offensive content. This expanded database of search queries can be used to train a search query classifier and modify search results provided in response to search queries seeking inappropriate sensitive or offensive content. An advantage of the method and system according to the implementations described herein is that a large database of terms can be acquired with minimal human input and used to train a search query classifier.

Innovative aspects of the subject matter described in this specification may, in some implementations, be a non-transitory computer-readable storage medium that includes instructions, which, when executed by one or more computers, cause the one or more computers to perform actions. The actions include obtaining one or more reference queries that are associated with a particular type of content and identifying a set of co-occurring queries that co-occur with any of the one or more reference queries in a collection of search queries received by a search engine. For each of the co-occurring queries, the co-occurring query is classified as (i) a candidate query, or (ii) not a candidate query. One or more queries of the candidate queries are determined to be likely associated with the particular type of content and provided as training data for training a classifier.

In some implementations, each of the one or more reference queries that are associated with the particular type of content includes two or more terms associated with the particular type of content.

In some implementations, the action of identifying the set of co-occurring queries that co-occur with any of the one or more reference queries in the collection of search queries received by the search engine includes determining, for each co-occurring query, that the co-occurring query is received by the search engine within a determined time period of any reference query being received.

In some implementations, the action of identifying the set of co-occurring queries that co-occur with any of the one or more reference queries in the collection of search queries received by the search engine, includes one or more actions. These one or more actions include receiving an indication that a search query is associated with the subset of the particular type of content, and receiving an indication that a search query is received by the search engine a number of times that satisfies a particular threshold.

In some implementations, for each of the co-occurring queries, the action of classifying the co-occurring query as a candidate query based at least on the co-occurrence value includes determining that a co-occurrence value associated with the co-occurring query satisfies a co-occurrence threshold. The co-occurrence value is determined based on (i) a number of occurrences of the co-occurring query in the collection of the search queries received by the search engine, and (ii) a number of co-occurrences of the co-occurring query with any reference query in the collection of the search queries received by the search engine.

In some implementations, the action of determining that one or more queries of the candidate queries is likely associated with the particular type of content, includes determining that the one or more queries of the candidate queries satisfies one or more criteria. The one or more criteria includes one or more of: (i) determining that any reference query in the collection of the search queries is received, by the search engine from the same user, within a determined time period before or after the candidate query; (ii) determining that the candidate query is not associated with appropriate sensitive content and appropriate offensive content; and (iii) determining that the candidate query was received from the same user once in a calendar day.

In some implementations, the one or more computers are further configured to perform actions including receiving a search query from a user, determining that the search query from the user includes the one or more candidate queries that are classified as likely associated with the particular type of content, and modifying search results obtained in response to receiving the search query from the user.

In some implementations, a computer-implemented method includes actions of obtaining a first set of seed terms related to a particular type of content, obtaining a second set of seed terms related to a subset of the particular type of content, identifying a set of search queries that include one or more terms from the first set of seed terms and one or more terms from the second set of seed terms, and classifying one or more queries of the identified set of search queries as reference queries. The reference queries are associated with the subset of the particular type of content. For each of the reference queries that are associated with the subset of the particular type of content, a set of co-occurring queries that co-occur with any reference query in a collection of search queries received by a search engine is identified. The actions of the computer-implemented method further include determining, for each of the co-occurring queries in the set of the co-occurring queries: (i) a number of occurrences of the co-occurring query in the collection of the search queries received by the search engine; and (ii) a number of co-occurrences of the co-occurring query with any reference query in the collection of the search queries received by the search engine. For each of the co-occurring queries, a co-occurrence value is determined based on (i) the number of occurrences of the co-occurring query in the collection of the search queries received by the search engine, and (ii) the number of co-occurrences of the co-occurring query with any reference query in the collection of the search queries received by the search engine. For each of the co-occurring queries, the co-occurring query is classified as (i) a candidate query, or (ii) not a candidate query, based at least on the co-occurrence value. The actions of the computer-implemented method further include determining, for each candidate query, whether the candidate query satisfies one or more criteria associated with selecting queries that are likely associated with the subset of the particular type of content. Each candidate query is classified as (i) likely associated with the subset of the particular type of content, or (ii) unlikely to be associated with the subset of the particular type of content, based at least on whether the candidate query is determined to satisfy the one or more criteria. One or more candidate queries that are classified as likely associated with the particular subset of the particular type of content are provided as training data for training a classifier.

In some implementations, a system includes one or more computers and one or more storage devices storing instructions that are operable and when executed by one or more computers, cause the one or more computers to perform actions. The actions include obtaining a first set of seed terms related to a particular type of content, obtaining a second set of seed terms related to a subset of the particular type of content, identifying a set of search queries that include one or more terms from the first set of seed terms and one or more terms from the second set of seed terms, and classifying one or more queries of the identified set of search queries as reference queries. The reference queries are associated with the subset of the particular type of content. For each of the reference queries that are associated with the subset of the particular type of content, a set of co-occurring queries that co-occur with any reference query in a collection of search queries received by a search engine is identified. The actions of the computer-implemented method further include determining, for each of the co-occurring queries in the set of the co-occurring queries: (i) a number of occurrences of the co-occurring query in the collection of the search queries received by the search engine; and (ii) a number of co-occurrences of the co-occurring query with any reference query in the collection of the search queries received by the search engine. For each of the co-occurring queries, a co-occurrence value is determined based on (i) the number of occurrences of the co-occurring query in the collection of the search queries received by the search engine, and (ii) the number of co-occurrences of the co-occurring query with any reference query in the collection of the search queries received by the search engine. For each of the co-occurring queries, the co-occurring query is classified as (i) a candidate query, or (ii) not a candidate query, based at least on the co-occurrence value. The actions of the computer-implemented method further include determining, for each candidate query, whether the candidate query satisfies one or more criteria associated with selecting queries that are likely associated with the subset of the particular type of content. Each candidate query is classified as (i) likely associated with the subset of the particular type of content, or (ii) unlikely to be associated with the subset of the particular type of content, based at least on whether the candidate query is determined to satisfy the one or more criteria. One or more candidate queries that are classified as likely associated with the particular subset of the particular type of content are provided as training data for training a classifier.

In some implementations, the action of identifying a set of search queries that include one or more terms from the first set of seed terms and one or more terms from the second set of seed terms, includes one or more actions. These actions include receiving an indication that a search query is associated with the subset of the particular type of content, and receiving an indication that a search query is received by the search engine a number of times that satisfies a particular threshold.

In some implementations, the action of determining, for each of the co-occurring queries in the set of the co-occurring queries, a number of co-occurrences of the co-occurring query with any reference query of the one or more reference queries in the collection of the search queries received by the search engine, includes an action of determining a number of times the co-occurring query is received by the search engine within a particular time period before or after a time at which any reference query in the collection of the search queries is received by the search engine.

In some implementations, classifying each of the co-occurring queries as a candidate query based at least on the co-occurrence value includes determining, for each co-occurring query, that the co-occurrence value associated with the co-occurring query satisfies a co-occurrence threshold.

In some implementations, the one or more criteria includes one or more of: (i) determining that any reference query in the collection of the search queries is received, by the search engine from the same user, within a determined time period before or after the candidate query; (ii) determining that the candidate query is not associated with appropriate sensitive content and appropriate offensive content; and (iii) determining that the candidate query was received from the same user once in a calendar day.

In some implementations, a search query from a user is received. The search query from the user is determined to include the one or more candidate queries that are classified as likely associated with the subset of the particular type of content, and search results obtained in response to receiving the search query from the user are modified.

In some implementations, the action of modifying the search results obtained in response to receiving the search query from the user includes one or more actions. These actions include removing, from the search results, content associated with the subset of the particular type of content, and decreasing, in the search results, a ranking of a resource that includes the content associated with the subset of the particular type of content.

In some implementations, the action of classifying, for each of the co-occurring queries, the co-occurring query as (i) a candidate query, or (ii) not a candidate query, based at least on the co-occurrence value includes determining whether the co-occurrence value of the co-occurring query is within a determined proximity threshold of satisfying a candidate threshold. In response to determining that the co-occurrence value of the co-occurring query is within the determined proximity threshold of satisfying the candidate threshold, a verification action to verify that the co-occurring query is associated with the subset of the particular type of content is performed. The co-occurring query is classified as a candidate query based on verifying that the co-occurring query is associated with the subset of the particular type of content.

In some implementations, for each of the candidate queries that are classified as likely associated with the particular subset of the particular type of content, one or more queries related to the candidate query are generated using modifications of the candidate query. The modifications of the candidate query include one or more of: (i) a modified spelling of the candidate query, (ii) an incorrect spelling of the candidate query, and (iii) one or more character n-grams of the candidate query. The one or more queries related to the candidate query that is classified as likely associated with the particular subset of the particular type of content are provided as training data for training the classifier.

In some implementations, a classification input associated with one or more of the candidate queries that are classified as likely associated with the particular subset of the particular type of content is received. The one or more of the candidate queries are classified according to the received classification input and provided as training data for training the classifier.

Other embodiments of these aspects include corresponding systems, apparatus, and computer programs, configured to perform the actions of the methods, encoded on computer storage devices.

The details of one or more embodiments are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

This disclosure generally describes a method and system for training a classifier to identify search queries seeking inappropriate sensitive or offensive content. Some implementations of the method are described in FIGS. 2-4.

Figure 1:
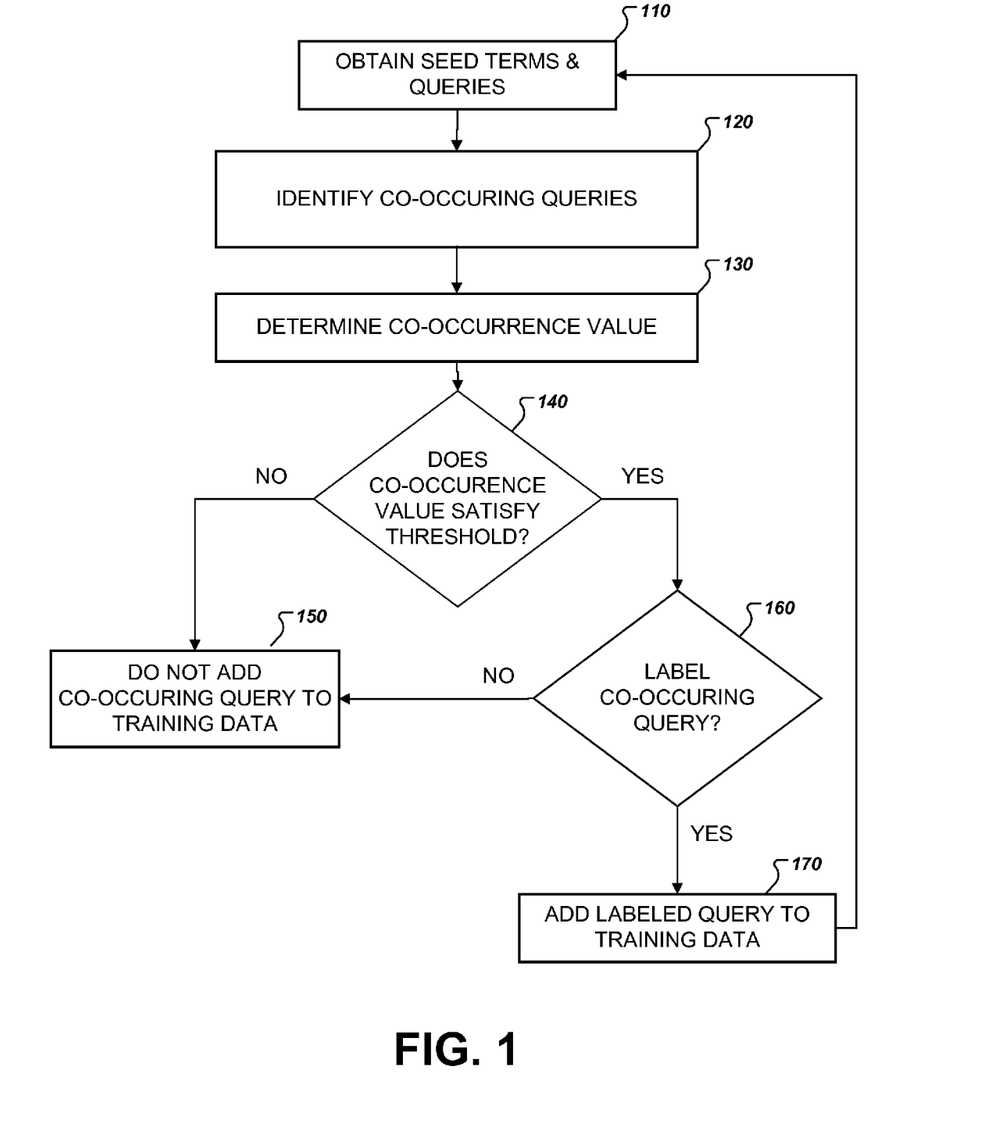
FIG. 1 depicts a flowchart illustrating a method for training a classifier to identify search queries seeking inappropriate sensitive or offensive content.
Figure 2:
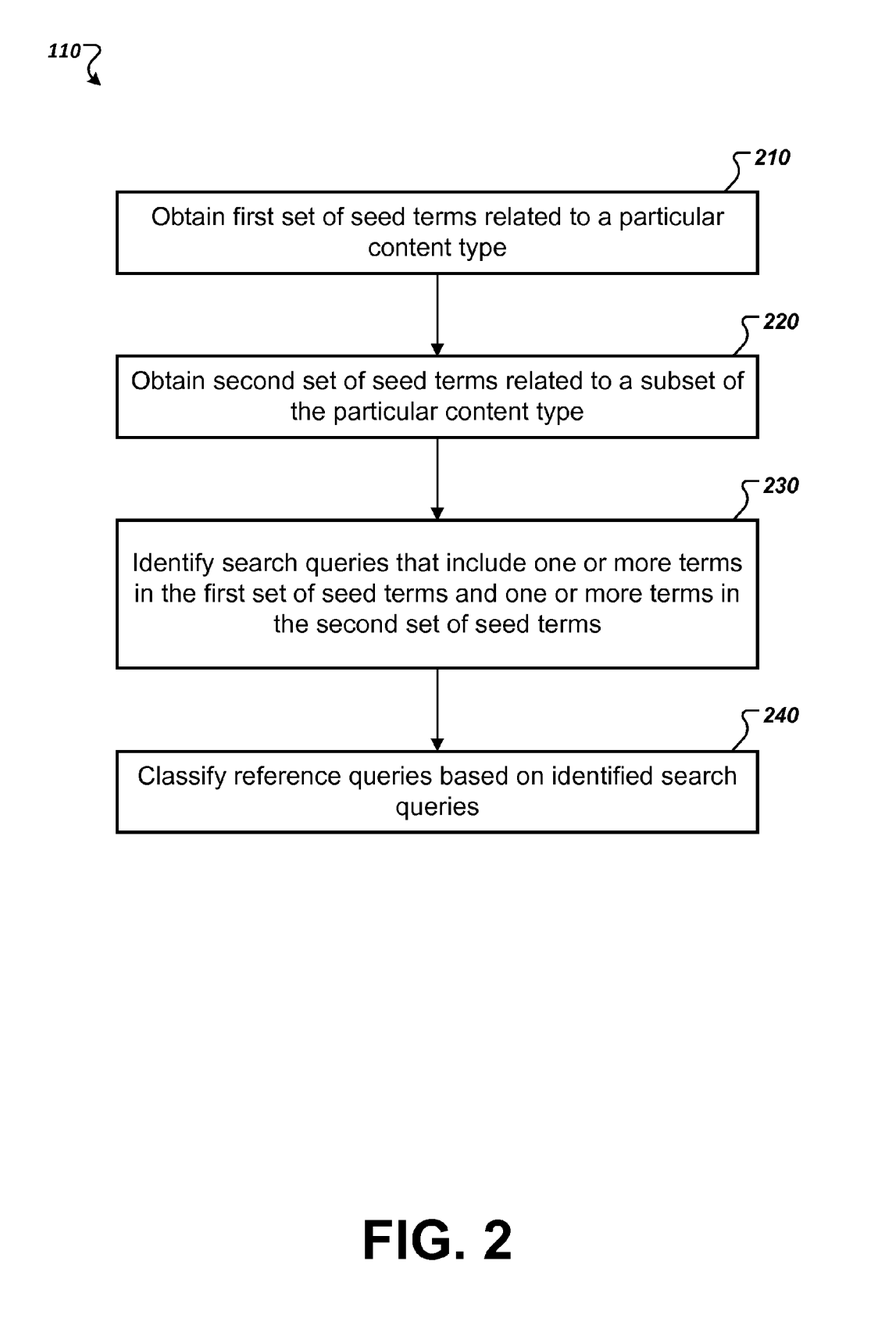
FIG. 2 depicts a flowchart illustrating a method for the operation in FIG. 1 to obtain seed terms and queries.

Referring to FIGS. 1 and 2, to train a search query classifier, initially seed terms and queries are obtained (110). In particular, a collection of a first set of seed terms related to a particular content type (210) and a collection of a second set of seed terms related to a subset of the particular content type (220) may be obtained.

The particular content type may be a content type selected from any subject matter of interest. The subject matter of interest may be determined by an administrator of the search query classifier. For example, in some cases, the particular content may generally relate to children, and the first set of seed terms may be any term associated with children. In the example of children, this first set of seed terms may include, for example, terms such as "teen," "teenager," "kindergarten," and "infant." It should be understood that various terms associated with a particular content may be obtained, and that the association of terms with particular content may change over time.

The subset of particular content type may include one or more subject matter categories of inappropriate sensitive or offensive content associated with the particular content type. For example, in some cases, the subset of particular content may generally relate to violence, and the second set of seed terms may be any term associated with violence. In the example of a "violence" subset, this second set of seed terms may include, for example, terms such as "gun," "rifle," "bomb," and "gang."

In another example, the subset of particular content may generally relate to pornography, and the second set of seed terms may be any term associated with pornography. In the example of pornography, the second set of seed terms may include, for example, terms such as "porn," "rape," and "sex." In general, it should be understood that various terms associated with the subset of particular content may be obtained, and that the association of terms with subset of particular content may change over time.

It should be appreciated that although example of particular types of subject matter are provided in this disclosure, these examples are not meant to be limiting. The particular content and subset of particular content may include various types of content.

Next, search queries that include one or more terms of the first set of seed terms and one or more terms of the second set of seed terms are identified (230). Various suitable methods may be used to identify the search queries that include one or more terms of the first set of seed terms and one or more terms of the second set of seed terms. For example, in some implementations, search logs or databases of search query entries may be searched using, for example, a keyword match, to identify search query entries in the search logs or the databases of search entries with terms that match one or more terms of the first set of seed terms and one or more terms of the second set of seed terms. The identified search query entries are extracted from the search logs or the databases of search entries for further processing.

In some implementations, a search frequency of the identified search query entries is determined and only the identified search query entries that have been searched a number of times that satisfies a particular threshold are extracted. For example, in some cases, only search entries that have been searched a threshold number of times during a particular time period using a particular search engine are extracted. In some cases, only the top ranking identified search query entries (e.g., top 10, top 100, top 500) ranked based on search frequency are extracted.

Next, the extracted search query entries are classified as reference queries if, upon verification, the extracted search query entries are determined to be related to the subset of particular content (240). To classify the extracted search query entries as reference queries various suitable verification methods may be used.

For instance, in some implementations, a filter, algorithm, or combination thereof, may be used to determine a context of the extracted search query entries, a meaning of the extracted search query entries, and/or an application of the extracted search query entries. If the context, meaning, and/or application of an extracted search query entry is determined to be related to the subset of particular content, the extracted search query entry is classified as a reference query.

In some implementations, human review may be used to verify whether the extracted search query entries are related to the subset of the particular content. If an extracted search query entry is determined to be related to the subset of the particular content, the extracted search query entry is classified as a reference query.

Referring to FIG. 1, after obtaining seed terms and one or more reference queries (110), for each reference query, one or more co-occurring queries are identified (130). Co-occurring queries are queries that have been submitted by users of a search engine within a determined period of time of a reference query. The determined period of time may be any suitable time configured by an administrator of the search query classifier. The determined period of time may be, for example, 2 minutes, 5 minutes, 10 minutes, 30 minutes, or 1 hour. The determined period of time may include time before or after a reference query was submitted to the search engine. In some implementations, the determined period of time may be empirically determined.

It should be understood that any suitable method may be used to identify the one or more co-occurring queries. For example, search logs of the search engine or other databases of search queries may be examined and queries co-occurring with a reference query may be identified.

In some implementations, a particular count of the number of times a query co-occurs with a particular reference query is determined. In some implementations, a reference count of the number of times a query co-occurs with any reference query and a cumulative count of the number of times a query is entered or listed in the search log or databases of search queries. The reference count and the cumulative count may be used to determine a co-occurrence value (130). The co-occurrence value may be a ratio of the reference count to the cumulative count.

As an example, a query "where to purchase guns" may be received by a search engine one thousand times a day, and may co-occur with reference queries (e.g., "Columbine shooting anniversary," "school shooting") a hundred times a day. Accordingly, the query "where to purchase guns" would have a 100 to 1000 or 10% co-occurrence value. As another example, a query "child sex" may occur ten thousand times a day, and may co-occur with reference queries (e.g., "teen rape") six hundred times a day. Accordingly, the query "child sex" would have a 600 to 10,000 or 6% co-occurrence value.

After the co-occurrence value is determined for a co-occurring query, the co-occurrence value is compared with a determined co-occurrence threshold to determine if the co-occurrence value for a co-occurring query satisfies the determined co-occurrence threshold (140).

If the co-occurrence value for a co-occurring query does not satisfy the determined co-occurrence threshold, the co-occurring query is labeled as unlikely associated with the subset of particular content and is not added to training data for the search query classifier (150).

In some implementations, if the co-occurrence value for a co-occurring query does not satisfy the determined co-occurrence threshold but is within a determined proximity of the co-occurrence threshold, the co-occurring query may be further verified. The further verification may include any suitable type of verification, such as a human review, to verify whether the co-occurring query is associated with the subset of particular content. If the further verification indicates that the co-occurring query is associated with the subset of particular content, the co-occurring query is assigned a label if the co-occurring query satisfies a criteria (160). The determined proximity may be set by an administrator of the search query classifier. For example, the determined proximity may be set to a threshold range (e.g., within 5 percent or 2 percent) of the co-occurrence threshold.

In some implementations, if the co-occurrence value for a co-occurring query does satisfy the determined co-occurrence threshold, the co-occurring query is assigned a label if the co-occurring query satisfies a criteria (160). An explanation of the criteria is provided in FIG. 3.

Figure 3:
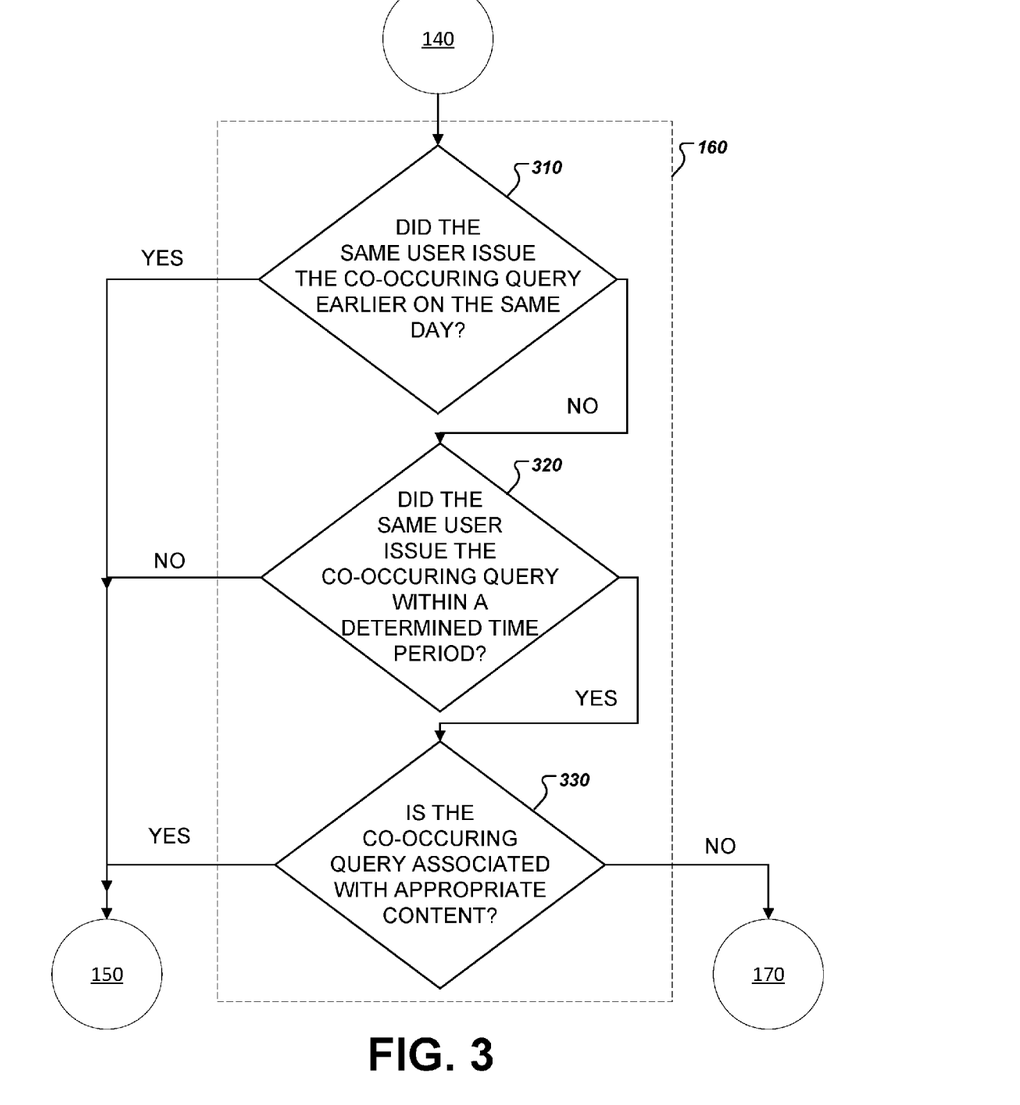
FIG. 3 depicts a flowchart illustrating a method for the operation in FIG. 1 of labelling a co-occurring query.

Referring to FIG. 3, a search record of the co-occurring query is examined to determine if the same user issued the co-occurring query earlier on the same calendar day (310). If the same user issued the co-occurring query earlier on the same calendar day, the co-occurring query is not added as training data for the search query classifier (150).

If the same user did not issue the co-occurring query earlier on the same calendar day, the search record of the co-occurring query is further examined to determine if the same user issued a reference query within the determined time period of entering the co-occurring query in the search query (320).

If the same user did not issue a reference query within the determined time period of entering the co-occurring query in the search query, the co-occurring query is not added as training data for the search query classifier (150). If the same user did issue a reference query within the determined time period of entering the co-occurring query in the search query, the co-occurring query is further examined to determine if the co-occurring query includes or is related to appropriate offensive content or appropriate sensitive content (330).

The administrator of the search query classifier may control the classification of content into different categories, such as, for example, appropriate sensitive content, inappropriate sensitive content, appropriate offensive content, and inappropriate offensive content. As an example, queries such as "how to shoot my classmates" may be classified as inappropriate sensitive content, whereas "school shooting" may be classified as appropriate sensitive content. In another example, queries such as "preteen sex" may be classified as inappropriate sensitive content and inappropriate offensive content, whereas "sex" or "pornography" may be classified as appropriate sensitive content and appropriate offensive content.

If the co-occurring query includes or is related to appropriate offensive content or appropriate sensitive content, training data associated with the co-occurring query is not added as training data for the search query classifier (150). If the co-occurring query includes or is related to inappropriate offensive content or inappropriate sensitive content, the co-occurring query is labeled as likely associated with the subset of particular content. The labeled co-occurring query is then provided to the search query classifier as training data for queries associated with the subset of particular content (170).

In some implementations, a labelled co-occurring query may be expanded to multiple queries that are similar but not identical. The multiple queries may be generated through various types of modifications of the labelled co-occurring query and added as training data along with the labelled co-occurring query. For example, in some cases, a modified or incorrect spelling of the labelled co-occurring query may be generated. In some cases, a labelled co-occurring query may be split into one or more character-ngrams to generate multiple queries associated with the labelled co-occurring query.

The multiple queries generated and added as training data increase the amount of training data and may result in the search query classifier being robust against common variations of queries associated with the subset of particular content.

In some implementations, after the search query classifier is trained, the trained search query classifier may be calibrated by sampling queries with different classifications and confidences and presenting the queries to human operators for classification. If a classification of a query by the search query classifier systematically disagrees with a classification of the query by human operators, a classification of the query may be corrected by a monotonic transformation function that maps the search query classifier's confidence values to those obtained from human operators.

After the search query classifier is trained or trained and calibrated, the search query classifier may configure a search engine to modify search results in response to search queries that include the labeled co-occurring queries. Search engine receipt and output of data is described with reference to FIGS. 4 and 5.

Figure 4:
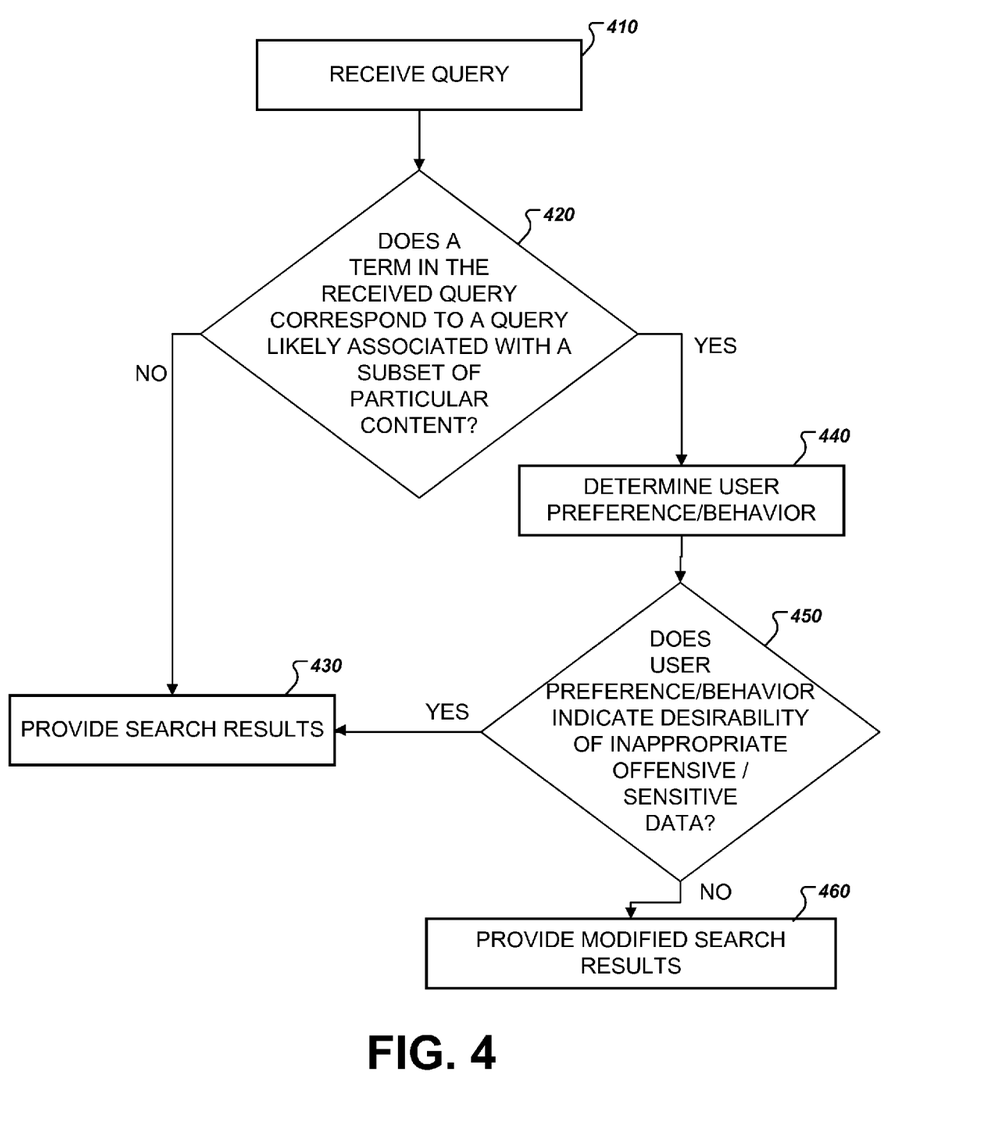
FIG. 4 depicts a flowchart illustrating a method for displaying search results using the trained classifier.

Referring to FIG. 4, a method of providing a search result according to a trained search query classifier is described. After a search query classifier has been trained according to the implementations described hereinabove, a search engine may receive a search query from a user (410). The search engine may determine if one or more terms in the received search query correspond to a query likely associated with a subset of particular content (420).

For example, when a user submits a query "how to poison children," the search engine may determine that the submitted query corresponds to a query likely associated with a subset (e.g., child violence) of particular content for which the search query classifier has been trained in. In another example, a user may submit a query "naughty children." In this case, the search engine may determine that the submitted query does not correspond to a query likely associated with a subset of particular content for which the search query classifier has been trained in.

If the one or more terms in the received search query do not correspond to a query likely associated with a subset of particular content, the search engine retrieves resources from a database and provides search results in response to the search query (430).

If the one or more terms in the received search query do correspond to a query likely associated with a subset of particular content, the search engine may determine user behavior or preferences (440). The search engine may use various suitable techniques to determine user behavior or preferences. The user behavior or preferences may include data indicative of subject matter, web pages, videos, images, and, in general, any content the user may be interested in obtaining information about.

In some implementations, the search engine may search the user's current or previous search session logs and, based on previously-submitted queries, determine user behavior or preferences.

In some implementations, the search engine may search the user's current search session log and, based on search results (e.g., images, links) selected by the user, determine user behavior or preferences.

In some implementations, a user may have provided an input, such as an activation of a filter (e.g., spoof content filter, pornography filter, under 18 filter, etc.) or button in the browser. Based on the user input, the search engine may determine user behavior or preferences.

After determining user behavior or preferences, the search engine determines if the user is interested in inappropriate offensive content or inappropriate sensitive content (450). For example, if the user has activated a child-lock or a filter (e.g., pornography filter, violent content filter), the search engine may determine that the user is not interested in search results that include inappropriate offensive content or inappropriate sensitive content. In another example, if the user has a history of viewing inappropriate offensive or sensitive content, the search engine may determine that the user is interested in search results that include inappropriate offensive or sensitive content.

If the search engine has determined that the user is not interested in search results that include inappropriate offensive or sensitive content, the search engine may modify the search results provided to the user (460). In some implementations, the search engine may modify the search results by decreasing the rank of resources that include inappropriate offensive or sensitive content. In some implementations, the search engine may suppress resources that include inappropriate offensive or sensitive content from the search results.

In some implementations, if the search engine has determined that the user is interested in search results that include inappropriate offensive or sensitive content, the search engine may provide search results without modifications (430). In some implementations, the search results may be modified by decreasing the ranking of resources that include inappropriate offensive or sensitive content to thereby limit the exposure of inappropriate offensive or sensitive content. For example, if the search engine has determined that the user is interested in search results that include inappropriate offensive or sensitive content such as child pornography, the search results may be modified such that child pornography content is suppressed (e.g., remove link to resource related to child pornography from search results, significantly lower ranking of resource related to child pornography) and, in some cases, not provided for a user.

Figure 5:
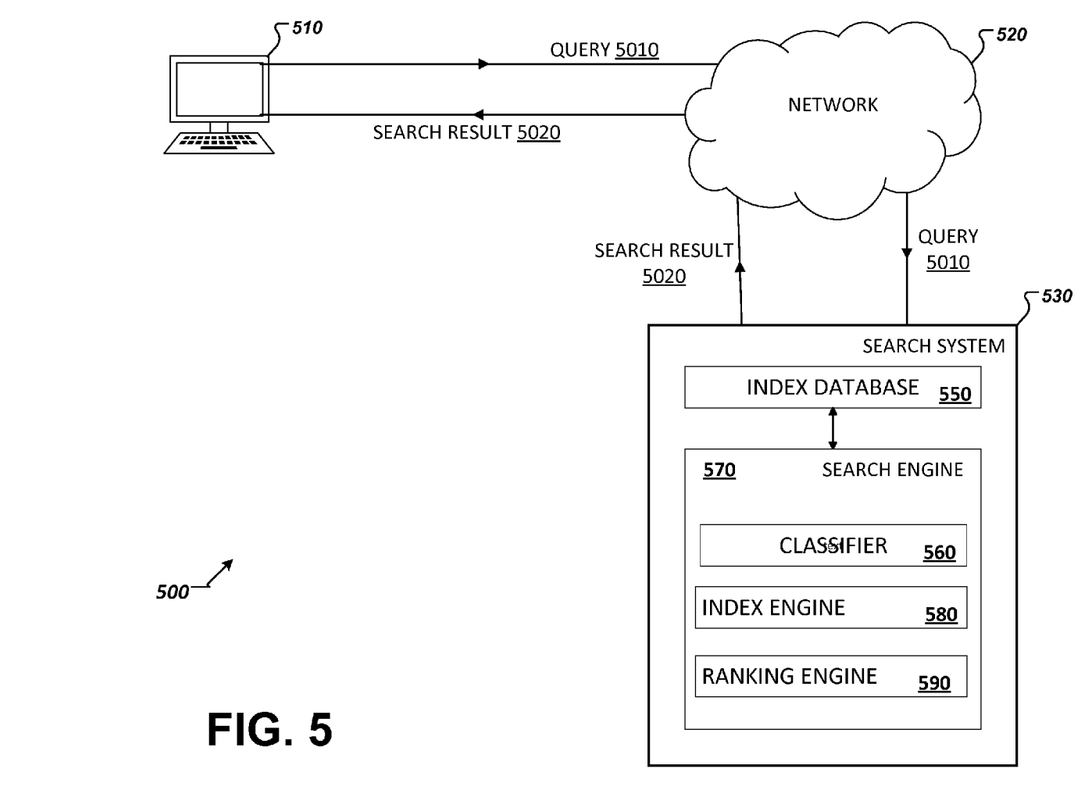
FIG. 5 depicts a block diagram illustrating a system for training a classifier to identify search queries seeking inappropriate sensitive or offensive content.

FIG. 5 depicts a block diagram illustrating a system 500 for implementing the training method described hereinabove. A user may access a search system 530 via network 520 using a user device 510.

User device 510 may be any suitable electronic device such as a personal computer, a mobile telephone, a smart phone, a smart watch, a smart TV, a mobile audio or video player, a game console, or a combination of one or more of these devices. In general, the user device 510 may be a wired or wireless device capable of browsing the Internet and providing a user with search results.

The user device 510 may include various components such as a memory, a processor, a display, and input/output units. The input/output units may include, for example, a transceiver which can communicate with network 520 to send one or more search queries 5010 and receive one or more search results 5020. The display may be any suitable display including, for example, liquid crystal displays, light emitting diode displays. The display may display search results 5020 received from the search system 530.

The network 520 may include one or more networks that provide network access, data transport, and other services to and from user device 510. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include one or more databases, access points, servers, storage systems, cloud systems, and modules. For instance, the one or more networks may include at least one server, which may include any suitable computing device coupled to the one or more networks, including but not limited to a personal computer, a server computer, a series of server computers, a mini computer, and a mainframe computer, or combinations thereof. The at least one server may be a web server (or a series of servers) running a network operating system, examples of which may include but are not limited to Microsoft® Windows® Server, Novell® NetWare®, or Linux®. The at least one server may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, data may be sent and received using any technique for sending and receiving information including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

The search system 530 can be implemented, at least in part, as, for example, computer script running on one or more servers in one or more locations that are coupled to each other through network 520. The search system 530 includes an index database 550 and a search engine 570, which includes a classifier 560, an index engine 580 and a ranking engine 590.

The index database 550 stores indexed resources found in a corpus, which is a collection or repository of resources. The resources may include, for example, web pages, images, or news articles. In some implementations, the resources may include resources on the Internet. While one index database 550 is shown, in some implementations, multiple index databases can be built and used.

The index engine 580 indexes resources in the index database 550 using any suitable technique. In some implementations, the index engine 580 receives information about the contents of resources, e.g., tokens appearing in the resources that are received from a web crawler, and indexes the resources by storing index information in the index database 550.

The search engine 570 uses the index database 550 to identify resources that match a search query 5010. The ranking engine 590 ranks resources that match a search query 5010. The ranking engine 590 may rank the resources using various suitable techniques. The search engine 570 transmits one or more search results 5020 through the network 520 to the user device 510. In some implementations, the search engine 570 provides search results 5020 to the user device 510 according to the method of providing search results depicted in FIG. 4.

Classifier 560 may include one or more search query classifiers. The search query classifier 560 may be trained according to the method of training a search query classifier depicted in FIGS. 1-3. For example, in some implementations, the classifier 560 may classify search queries as likely seeking a subset of a particular content or as unlikely seeking a subset of a particular content.

A user device 510 can connect to the search system 530 to submit a query 5010. The submitted query 5010 is transmitted through network 520 to the search system 530. The search system 530 responds to the query 5010 by generating search results 5020, which are transmitted through the network 520 to the user device 510 in a form that can be presented to the user (e.g., as a search results web page to be displayed in a web browser running on the user device 510).

When the search query 5010 is received by the search engine 570, the search engine 570 may classify the search query 5010 using classifier 560 and identify relevant resources (i.e., resources matching or satisfying classified query). Based on the classification of the received search query 5010 and identified relevant resources, the search engine 570 may provide search results 5020 as described above with respect to FIGS. 1-3.

An advantage of the method described hereinabove is that a large database of query terms can be obtained and continuously updated with minimal human input. This large database of query terms can be used to train a search query classifier to detect queries seeking inappropriate sensitive or offensive content.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on one or more computers having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A non-transitory computer-readable storage medium comprising instructions, which, when executed by one or more computers, cause the one or more computers to perform actions comprising:
   obtaining one or more reference queries that are associated with a particular type of content;
   identifying a set of co-occurring queries that co-occur with any of the one or more reference queries in a collection of search queries received by a search engine;
   for each of the co-occurring queries, classifying the co-occurring query as (i) a candidate query, or (ii) not a candidate query;
   determining that one or more queries of the candidate queries is likely associated with the particular type of content; and
   providing the determined one or more queries of the candidate queries that are likely associated with the particular type of content as training data for training a classifier.

2. The non-transitory computer-readable storage medium of claim 1, wherein each of the one or more reference queries that are associated with the particular type of content includes two or more terms associated with the particular type of content.

3. The non-transitory computer-readable storage medium of claim 1, wherein identifying the set of co-occurring queries that co-occur with any of the one or more reference queries in the collection of search queries received by the search engine, comprises:

for each co-occurring query, determining that the co-occurring query is received by the search engine within a determined time period of any reference query being received.

4. The non-transitory computer-readable storage medium of claim 3, wherein identifying the set of co-occurring queries that co-occur with any of the one or more reference queries in the collection of search queries received by the search engine, comprises one or more of:

receiving an indication that a search query is associated with the subset of the particular type of content; and receiving an indication that a search query is received by the search engine a number of times that satisfies a particular threshold.

5. The non-transitory computer-readable storage medium of claim 1, wherein classifying, for each of the co-occurring queries, the co-occurring query as (i) a candidate query based at least on the co-occurrence value, comprises:

determining that a co-occurrence value associated with the co-occurring query satisfies a co-occurrence threshold, the co-occurrence value being determined based on (i) a number of occurrences of the co-occurring query in the collection of the search queries received by the search engine, and (ii) a number of co-occurrences of the co-occurring query with any reference query in the collection of the search queries received by the search engine.

6. The non-transitory computer-readable storage medium of claim 1, wherein determining that one or more queries of the candidate queries is likely associated with the particular type of content, comprises determining that the one or more queries of the candidate queries satisfies one or more criteria, and wherein the one or more criteria comprises one or more of:

determining that any reference query in the collection of the search queries is received, by the search engine from the same user, within a determined time period before or after the candidate query;

determining that the candidate query is not associated with appropriate sensitive content and appropriate offensive content; and determining that the candidate query was received from the same user once in a calendar day.

7. The non-transitory computer-readable storage medium of claim 1, wherein the one or more computers are further configured to perform actions comprising:

receiving a search query from a user;

determining that the search query from the user includes the one or more candidate queries that are classified as likely associated with the particular type of content; and modifying search results obtained in response to receiving the search query from the user.

8. A computer-implemented method comprising:

obtaining a first set of seed terms related to a particular type of content;

obtaining a second set of seed terms related to a subset of the particular type of content;

identifying a set of search queries that include one or more terms from the first set of seed terms and one or more terms from the second set of seed terms;

classifying one or more queries of the identified set of search queries as reference queries, the reference queries being associated with the subset of the particular type of content;

identifying, for each of the reference queries that are associated with the subset of the particular type of content, a set of co-occurring queries that co-occur with any reference query in a collection of search queries received by a search engine;

determining, for each of the co-occurring queries in the set of the co-occurring queries, (i) a number of occurrences of the co-occurring query in the collection of the search queries received by the search engine, and (ii) a number of co-occurrences of the co-occurring query with any reference query in the collection of the search queries received by the search engine;

determining, for each of the co-occurring queries, a co-occurrence value based on (i) the number of occurrences of the co-occurring query in the collection of the search queries received by the search engine, and (ii) the number of co-occurrences of the co-occurring query with any reference query in the collection of the search queries received by the search engine;

classifying, for each of the co-occurring queries, the co-occurring query as (i) a candidate query, or (ii) not a candidate query, based at least on the co-occurrence value;

determining, for each candidate query, whether the candidate query satisfies one or more criteria associated with selecting queries that are likely associated with the subset of the particular type of content;

classifying each candidate query as (i) likely associated with the subset of the particular type of content, or (ii) unlikely to be associated with the subset of the particular type of content, based at least on whether the candidate query is determined to satisfy the one or more criteria; and providing one or more candidate queries that are classified as likely associated with the particular subset of the particular type of content as training data for training a classifier.

9. The computer-implemented method of claim 8, wherein identifying a set of search queries that include one or more terms from the first set of seed terms and one or more terms from the second set of seed terms, comprises one or more of:

receiving an indication that a search query is associated with the subset of the particular type of content; and receiving an indication that a search query is received by the search engine a number of times that satisfies a particular threshold.

10. The computer-implemented method of claim 8, wherein determining, for each of the co-occurring queries in the set of the co-occurring queries, (ii) a number of co-occurrences of the co-occurring query with any reference query of the one or more reference queries in the collection of the search queries received by the search engine, comprises:

determining a number of times the co-occurring query is received by the search engine within a particular time period before or after a time at which any reference query in the collection of the search queries is received by the search engine.

11. The computer-implemented method of claim 8, wherein classifying, for each of the co-occurring queries, the co-occurring query as (i) a candidate query based at least on the co-occurrence value, comprises:
   determining that the co-occurrence value associated with the co-occurring query satisfies a co-occurrence threshold.

12. The computer-implemented method of claim 8, wherein the one or more criteria associated with selecting queries that are likely associated with the subset of the particular type of content, comprises one or more of:
   determining that any reference query in the collection of the search queries is received, by the search engine from the same user, within a determined time period before or after the candidate query;
   determining that the candidate query is not associated with appropriate sensitive content and appropriate offensive content; and
   determining that the candidate query was received from the same user once in a calendar day.

13. The computer-implemented method of claim 8, further comprising:
   receiving a search query from a user;
   determining that the search query from the user includes the one or more candidate queries that are classified as likely associated with the subset of the particular type of content; and
   modifying search results obtained in response to receiving the search query from the user.

14. The computer-implemented method of claim 13, wherein modifying the search results obtained in response to receiving the search query from the user comprises one or more of:
   removing, from the search results, content associated with the subset of the particular type of content; and
   decreasing, in the search results, a ranking of a resource that includes the content associated with the subset of the particular type of content.

15. A system comprising:
   one or more computers and one or more storage devices storing instructions that are operable and when executed by one or more computers, cause the one or more computers to perform actions comprising:
      obtaining a first set of seed terms related to a particular type of content;
      obtaining a second set of seed terms related to a subset of the particular type of content;
      identifying a set of search queries that include one or more terms from the first set of seed terms and one or more terms from the second set of seed terms;
      classifying one or more queries of the identified set of search queries as reference queries, the reference queries being associated with the subset of the particular type of content;
      identifying, for each of the reference queries that are associated with the subset of the particular type of content, a set of co-occurring queries that co-occur with any reference query in a collection of search queries received by a search engine;
      determining, for each of the co-occurring queries in the set of the co-occurring queries, (i) a number of occurrences of the co-occurring query in the collection of the search queries received by the search engine, and (ii) a number of co-occurrences of the co-occurring query with any reference query in the collection of the search queries received by the search engine;
      determining, for each of the co-occurring queries, a co-occurrence value based on (i) the number of occurrences of the co-occurring query in the collection of the search queries received by the search engine, and (ii) the number of co-occurrences of the co-occurring query with any reference query in the collection of the search queries received by the search engine;
      classifying, for each of the co-occurring queries, the co-occurring query as (i) a candidate query, or (ii) not a candidate query, based at least on the co-occurrence value;
      determining, for each candidate query, whether the candidate query satisfies one or more criteria associated with selecting queries that are likely associated with the subset of the particular type of content;
      classifying each candidate query as (i) likely associated with the subset of the particular type of content, or (ii) unlikely to be associated with the subset of the particular type of content, based at least on whether the candidate query is determined to satisfy the one or more criteria; and
      providing one or more candidate queries that are classified as likely associated with the particular subset of the particular type of content as training data for training a classifier.

16. The system of claim 15, wherein identifying a set of search queries that include one or more terms from the first set of seed terms and one or more terms from the second set of seed terms, comprises one or more of:
   receiving an indication that a search query is associated with the subset of the particular type of content; and
   receiving an indication that a search query is received by the search engine a number of times that satisfies a particular threshold.

17. The system of claim 15, wherein determining, for each of the co-occurring queries in the set of the co-occurring queries, (ii) a number of co-occurrences of the co-occurring query with any reference query of the one or more reference queries in the collection of the search queries received by the search engine, comprises:
   determining a number of times the co-occurring query is received by the search engine within a particular time period before or after a time at which any reference query in the collection of the search queries is received by the search engine.

18. The system of claim 15, wherein classifying, for each of the co-occurring queries, the co-occurring query as (i) a candidate query, or (ii) not a candidate query, based at least on the co-occurrence value, comprises:
   determining whether the co-occurrence value of the co-occurring query is within a determined proximity threshold of satisfying a candidate threshold;
   responsive to determining that the co-occurrence value of the co-occurring query is within the determined proximity threshold of satisfying the candidate threshold, verifying that the co-occurring query is associated with the subset of the particular type of content; and
   classifying the co-occurring query as a candidate query based on verifying that the co-occurring query that has the co-occurrence value being within the determined proximity threshold of satisfying the candidate threshold is associated with the subset of the particular type of content.

19. The system of claim 15, wherein the one or more computers are further configured to perform actions comprising:

generating, for each of the candidate queries that are classified as likely associated with the particular subset of the particular type of content, one or more queries related to the candidate query using modifications of the candidate query, the modifications of the candidate query including one or more of: (i) a modified spelling of the candidate query, (ii) an incorrect spelling of the candidate query, and (iii) one or more character n-grams of the candidate query; and providing, as training data for training the classifier, the one or more queries related to the candidate query that is classified as likely associated with the particular subset of the particular type of content.

20. The system of claim 15, wherein the one or more computers are further configured to perform actions comprising:

receiving a classification input associated with one or more of the candidate queries that are classified as likely associated with the particular subset of the particular type of content;

classifying the one or more of the candidate queries according to the received classification input; and providing the one or more of the candidate queries classified according to the received classification input as training data for training the classifier.

* * * * *

UNITED STATES PATENT AND TRADEMARK OFFICE
CERTIFICATE OF CORRECTION

| | | |
|---|---|---|
| PATENT NO. | : 9,959,354 B2 | |
| APPLICATION NO. | : 14/747492 | |
| DATED | : May 1, 2018 | |
| INVENTOR(S) | : Nittka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 312 days.

Signed and Sealed this
Tenth Day of January, 2023

Katherine Kelly Vidal
*Director of the United States Patent and Trademark Office*